United States Patent [19]

Hentschel et al.

[11] 4,442,281

[45] Apr. 10, 1984

[54] THERMOPLASTIC POLYURETHANE-ELASTOMERS FROM CYCLOHEXANE-1,4-DIISOCYANATE

[75] Inventors: Peter Hentschel, Laudenbach; Walter Brodowski, Amorbach; Hans Zengel, Kleinwallstadt, all of Fed. Rep. of Germany

[73] Assignee: AKZO nv, Arnheim, Netherlands

[21] Appl. No.: 529,531

[22] Filed: Sep. 6, 1983

[30] Foreign Application Priority Data

Sep. 8, 1982 [DE] Fed. Rep. of Germany ....... 3233384

[51] Int. Cl.$^3$ ............................................. C08G 18/32
[52] U.S. Cl. ..................................................... 528/79
[58] Field of Search ........................................ 528/79

[56] References Cited
U.S. PATENT DOCUMENTS 4,203,916  5/1980  Zengel et al. ......................... 564/39

Primary Examiner—Maurice J. Welsh
Attorney, Agent, or Firm—Michael J. Striker

[57] ABSTRACT

Thermoplastically workable polyurethane-elastomers are disclosed which are obtained through polyaddition of substantially pure trans-cyclohexane-1,4-diisocyanate, macrodiols of average molecular weight from 800 to 4000 and bisethoxylated Bisphenol A or mixtures thereof with short-chain diols customarily employed as chain lengtheners. The polyurethanes possess the advantage that their softening points lie in a very favorable temperature range which makes possible their thermoplastic workability at below the decomposition temperature, and also guarantees outstanding mechanical-elastic characteristics as well as excellent long-term light stability. As a result the polyurethanes according to the present invention are outstandingly suitable as material for shaped bodies to be employed in areas of use placing high requirements on the employed materials. For example, highly valuable elastomer fibers can be manufactured from these polyurethanes by means of melt spinning.

26 Claims, 1 Drawing Figure

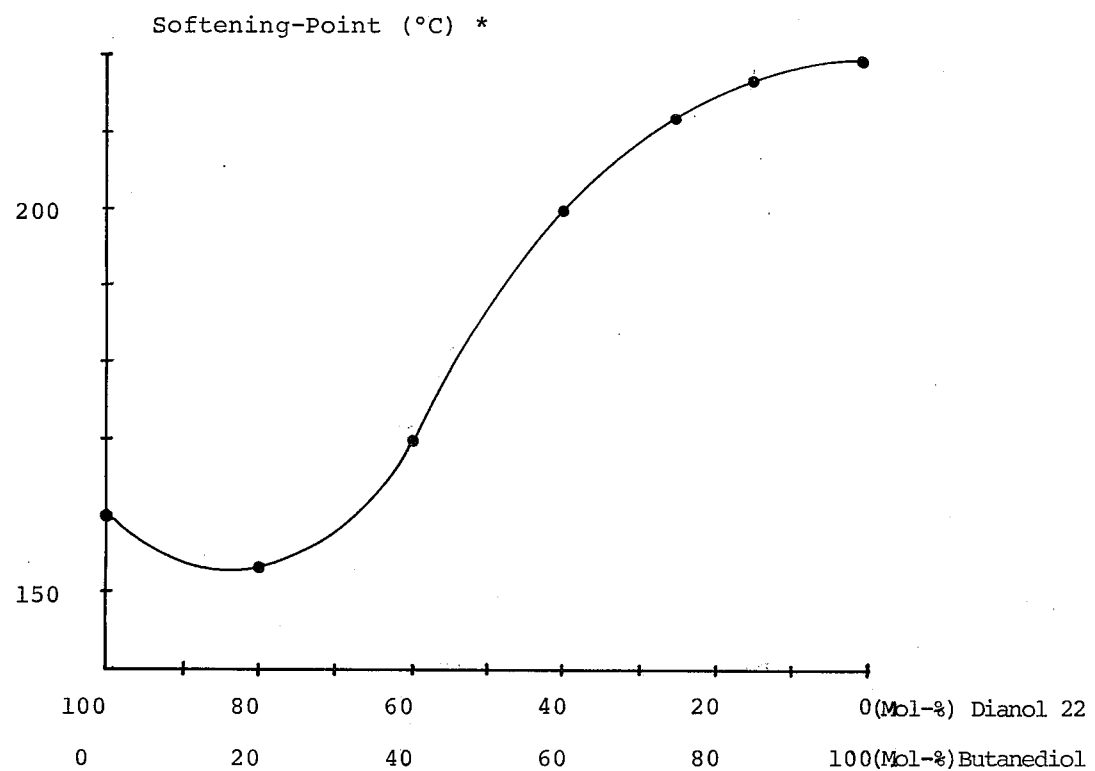

THERMOPLASTIC POLYURETHANE-ELASTOMERS FROM CYCLOHEXANE-1,4-DIISOCYANATE

BACKGROUND OF THE INVENTION

The invention concerns thermoplastically workable polyurethane-elastomers from substantially pure trans-1,4-cyclohexane-diisocyanate, short-chain diols and macrodiols, processes for the production of these elastomers as well as their use.

It has been known for a long time to call upon polyurethanes as the basis for the production of elastic materials. Such polyurethane-elastomers are formed through polyaddition of diisocyanates, predominantly methylene-bis-(4-phenylisocyanate), long-chain dihydroxy compounds, called "macrodiols", and lower-molecular dihydroxy- or diamino-compounds, the function of which is to act as chain lengthener.

Elastomers which have been formed by the use of diamino-compounds as chain lengtheners are designated, correspondingly, polyureaurethane.

Processes for the production of these polyurethanes are so fashioned that the macromolecule will display a suitable segment structure, composed of crystalline and amorphous blocks constructed in a certain arrangement. These blocks are referred to as hard segments and soft segments, respectively. Whereas the hard segments, based upon their crystalline characteristics, function as network fix points, the soft segments, upon use temperatures above their glass transition temperature, are responsible for the uncoiling characteristics of the elastomer (see e.g. "Textilpraxis International" 36 (1981), pages 839–844; "Entwicklungstendenzen auf dem Gebiet von Polyurethan-Elastomerfasern").

In order to produce, for example, elastomer fibers from these polyurethanes or polyureaurethanes, they are generally spun from their solutions. A spinning according to the melt-spinning technique, particularly economical and to be performed with high discharge velocities, at the same time environmentally compatible, is less suitable for the production of usable elastomer fibers.

It follows from e.g. Textilpraxis International 36 (1981), page 841, lines 39–46, that the urea groups—as elastomer-hard segment—cannot be melted without simultaneous decomposition, and they therefore are not generally obtained by means of melt-spin techniques. Moreover, thermoplastic polyurethane-elastomers with urethane hard segments have stabilities that are very low, no longer tolerable for the working-up into textiles.—The practical usefulness of those polyurethane-elastomer fibers constructed from aromatic diisocyanates, customarily short-chain diols and macrodiols, is thus limited, for example, in that they do not withstand the thermal loading occurring upon thermal fixation, dyeing, washing and ironing, on account of their low melt temperatures.—This applies in particular measure when these polyurethanes are constructed from aliphatic, instead of aromatic, diisocyantes.

As follows, moreover, from Lenzinger Berichte 45 (1978), 40, left column, last paragraph, polyureaurethanes cannot be worked up according to the melt-spin technique, but only according to the uneconomical dry-spinning or reaction-spinning processes. For the production of elastomer fibers, in practice these polyureaurethanes have carried through with diamines as chain lengtheners opposite polyurethanes with diols as chain lengtheners, since they display high hard segment melting points as well as excellent mechanical-elastic characteristics based upon a greater number of hydrogen bridge connections. These are conditioned, however, on simultaneously high melt temperatures, and are no longer stable in relation to the urea groups.

This disadvantage applies also for non-fading, i.e. fast-to-light, elastomer fibers from aliphatic diisocyanates, such as are described, e.g., in DE-OS No. 1,955,725. (Disclosure of polyureaurethanes, which are produced with cis/trans-mixtures of 1,4-cyclohexanediisocyanate and cycloaliphatic diamines as chain lengthener, and are worked up by means of solution spinning.)

Finally, in DE-OS No. 2,829,199, particularly valuable polyurethanes are described, which are obtained with the employment of practically pure trans-1,4-cyclohexanediisocyanate. These short, highly symmetrical, rigid diisocyanate molecules lead to a hard segment construction with higher order, higher hydrogen bridge connection density and crystallinity. The polyurethanes or polyureaurethanes distinquish through a particularly distinctly marked separation of the hard and soft segment blocks. Dependent upon this, they have low glass transition temperatures, particularly high softening temperatures, as well as excellent mechanical-elastic characteristics. Thermoplastically workable polyurethanes are also described. Useful fibers are, however, only obtained through spinning from solution, since under the various thermoplastic working-up processes, preparation by spinning from the melt is a special case characterized by long dwell times for the polymers in the high temperature range of the apparatus, high occurring shearing forces in the filters and nozzle, and low, required melt viscosities, to which particular requirements the thermoplastic polymer material is not equal too.

SUMMARY OF THE INVENTION

It is therefore an object according to the present invention to make available thermoplastically workable polyurethanes, particularly for filling the following combination of high requirements: workability according to the melt-spin process, requiring no solvent, economical and environmentally compatible, without impairing the mechanical-elastic elastomer characteristics; non-fading without addition of stabilizers through use of an aliphatic diisocyanate; excellent mechanical-elastic characteristics, in particular high force absorption and elongation at break, low remaining elongation, good hysteresis behavior and non-sticking surface grip; softening point in a suitable range. (This last factor must, on the one hand, be sufficiently low that the melt-spin process can be accomplished below the decomposition temperature of the polyurethane. It must, on the other hand, be sufficiently high as to assure a sufficient thermal stability, e.g. also of the fiber material, upon thermal fixation, dyeing, washing, ironing, and the like.)

This object is attained according to the present invention by thermoplastically workable polyurethane-elastomers, which are obtained through polyaddition of substantially pure trans-cyclohexane-1,4-diisocyanate, macrodiols of an average molecular weight from 800 to 4000 and chain lengtheners with at least two active hydrogen atoms. Specifically, the chain lengthener is composed of bisethoxylated Bisphenol A or mixtures of bisethoxylated Bisphenol A with other short-chain diols, customarily employed as chain lengtheners. That is, bisethoxylated Bisphenol A is employed as chain lengthener, exclusively or in mixture to a determined extent with other known chain lengtheners.

Embodiments of thermoplastic working-up would include melt-spinning, injection moulding, nozzle extrusion, calendering, hot pressing, lamination coating, embossing, among others.

The bisethoxylated Bisphenol A to be used for the production of the polyurethane-elastomers according to the present invention must be used as chain lengthener, alone or else in mixture with diols of short chain length customarily employed as chain lengtheners. Such diols can be, for example, ethylene glycol, 1,4-butanediol, 2,3-butanediol, 2,5-hexanediol, 2,5-dimethyl-2,5-hexanediol, 1,2-propanediol, 1,3-propanediol or 1,5-pentanediol. 1,4-butanediol is a preferred diol used in mixture with bisethoxylated Bisphenol A.

It is preferred to employ mixtures of bisethoxylated Bisphenol A and diol containing the bisethoxylated Bisphenol A to the extent of at least 40 Mol percent.

The cyclohexane-1,4-diisocyanate used for the construction of the polyurethane-elastomers according to the present invention have a high content of trans-isomers of at least 85%, relative to the cyclohexane-1,4-diisocyanate -isomer mixture.

Preferably, the cyclohexane-1,4-diisocyanate isomer mixture will contain at least 95% trans-isomer content. It is particularly favorable when the trans-isomer content amounts to 99%.

Suitable macrodiols for construction of the polyurethanes according to the present invention are the macrodiols mentioned in DE-OS No. 28 29 199 with preferably terminally disposed hydroxyl groups. By way of example, polyester, polyacetal, polylactone, polycarbonate, among others, may be mentioned. Less suitable are aliphatic polyethers, since they provide extraordinarily thermal-unstable polyurethanes in combination with aliphatic diisocyanates such as cyclohexane-1,4-diisocyanate, which can hardly be suitable for a thermoplastic working-up.

Proving particularly favorable are polyesters based upon adipic acid and glycols, of which the mixed polyesters from adipic acid and several glycols are particularly to be mentioned. Therewith it has been proven advantageous if the glycol mixture from which the mixed polyester is constructed contains both short and long chain, or branched and unbranched, glycols. However, the limit between short and long chain is relatively fluid, and is to be seen relative to the employed glycols. Thus, glycols with 2 up to 4, or even up to about 6 carbon atoms can be designated as short-chain, whereby the glycols then having more than 6 chain carbon atoms are, in contrast, designated as long chain.

The macrodiols can be blended up to a determined extent even with trifunctional compounds, e.g. polyesters, which also contain triols as alcohol component, e.g. trimethylolpropane.

In addition, even mixtures of different macrodiols can be used.

The polyurethanes according to the present invention can be produced according to a one-stage process. Herewith the macrodiols and the bisethoxylated Bisphenol A are provided together in a reaction vessel, melted, and freed of moisture at about 100° C. under vacuum. One can thereupon cool the reaction mixture to 65° C. and add the cyclohexane-1,4-diisocyanate in solid form. This then dissolves within a few minutes into a clear melt, which aerates out under vacuum, is then cast into plates, and hardened at 110° C. The plates are subjected to a reduction in size, i.e. comminuted, in a manner suitable for thermoplastic working up, by means of cuttings, carving or milling.

To an equal extent, however, also other process variations usual in polyurethane chemistry are suitable.

Thus, e.g. according to the "prepolymer technique", polyesterdiol and cyclohexane -1,4-diisocyanate are reacted at 120° C. into a prepolymer. The bisethoxylated Bisphenol A, which possesses a melting point of 140° C., must be added at a temperature of at least 120° C. Corresponding to the higher temperature, the so-called pot time of the polyurethane melt is shortened.

According to the "semiprepolymer technique", finally, the diisocyanate is reacted into semiprepolymer with only a part of the polyesterdiol. The other part of the polyesterdiol is then added, together with the bisethoxylated Bisphenol A. Since the melting point of the bisethoxylated Bisphenol A in mixture with the polyester is strongly lowered, lower mixture temperatures and correspondingly longer pot times are possible, analogous to the one-step process.

Proceeding in particular from these principles even continuous mixing and polyaddition techniques can be performed.

In surprising manner the polyurethanes according to the present invention display very good mechanical-elastic characteristics, although the hydrogen bridge connection density in the hard segments is decreased through the relatively long-chain, sterically exacting chain lengthener molecule. It is to be expected theoretically that a smaller number of hydrogen bridge connections leads to a lowering of the hard segment melting point. It is, however, surprising that the polyurethanes according to the present invention display softening points in an optimal temperature range which, on the one hand, makes them outstandingly suitable to be thermoplastically worked up below the decomposition temperature. Moreover, on the other hand, this guarantees that the good mechanical-elastic characteristics are maintained within a broader temperature range.

The long-term light stability of these polyurethanes should also be emphasized. This is attained already without the addition of specific light stabilizers, a prominent feature according to the present invention. In contrast, it is known that e.g. polyurethane-elastomer fibers manufactured from aromatic diisocyanates themselves display only a temporally limited light stability, when they are manufactured with the addition of monomeric light stabilizers.

On the basis of this favorable combination of charcteristics, the polyurethanes according to the present invention are outstandingly suitable for the production of shaped bodies to be worked up thermoplastically for a multiplicity of employment areas in which high requirements are placed.

The polyurethanes according to the present invention are particularly outstandingly suitable for the production of elastomer fibers of higher quality by means of melt spinning. The relatively low softening points of these polyurethane fibers is still sufficiently high in order for the fiber material to be able to withstand the thermal requirements upon dyeing, washing, heat fixation, ironing and the like.

BRIEF DESCRIPTION OF THE DRAWING

FIG. 1 is a graphical representation showing softening temperatures of the polyurethane as a function of the composition of the chain lengthener. The softening point is determined as the flow temperature of thin foil strips under defined loading of 1.6 [N.cm$^{-2}$].

The novel features which are considered characteristic for the invention are set forth in particular in the appended claims. The invention itself, however, both as to its construction and its method of preparation and use will be best understood from the following description of specific embodiments.

DESCRIPTION OF THE PREFERRED EMBODIMENTS

In the following Examples, Dianol 22 is employed as bisethoxylated Bisphenol A. (Commercial product of Akzo having about 98% purity.)

Examples 1 and 2 concern the production of polyurethane-elastomer fibers by melt spinning.

EXAMPLE 1

A stirring vessel is filled with 23.52 kg of a copolyesterdiol, prepared from adipic acid, 1,6-hexanediol and neopentylglycol (Elastophen 2002, MW=2000) and 635 g of a 25% dispersion of TiO$_2$ in Elastophen 2002, prepared by means of one-step dispersing of TiO$_2$ in molten Elastophen 2002 warmed to 60° C. in a pearl mill (a total of 12 Mol Elastophen 2002), together with 3.79 kg (12 Mol) Dianol 22. For removal of moisture the mass is stirred for 2 hours at 100° C. under a vacuum. Subsequently, the mixture is cooled to 75° C. 48 g diazabicyclooctane (DABCO) as catalyst (ca. 0.15% by weight, relative to the final amount of polyurethane) and 4.18 kg (25.2 Mol) trans-1,4-cyclohexanediisocyanate (CHDI) are added in solid form. The NCO/OH ratio amounts to 1.05. Within 5 minutes there arises a clear melt. The temperature drops to about 60° C. After 10 minutes of de-aeration under vacuum, the reaction mixture is cast into plates having a layer thickness of 4 mm, hardened for 24 hours at 110° C., and placed in shredded form in a drum cutter so as to be suitable for thermoplastic working-up.

The relative viscosity, measured in dimethylacetamide +4% LiCl with a concentration of 0.5 g/dl, amounts to $\eta_{rel}$=1.48. The material is worked up, by means of melt spinning with discharge velocities between 200 and 1000 m/min., into fibers. Therein the temperature in the extruder amounts to between 190° and 200° C. and in the further parts of the spinning machine, 205°-235° C.

The characteristics of the prepared fibers depend upon numerous spinning parameters.

Typical values for the extension elasticity characteristics according to DIN 53835 are set forth in Table 1.

EXAMPLE 2

A semiprepolymer is manufactured, by mixing 1500 g (0.75 Mol) of dry Elastophen 2002 with 335.3 g (2.02 Mol) trans-1,4-cyclohexanediisocyanate. The mixture is then heated for 2 hours to 120° C.

A second reaction component is manufactured by adding to a further 500 g (0.25 Mol) of dried Elastophen 2002 a chain lengthener mixture composed of 45 g (0.5 Mol) 1,4-butanediol and 158 g (0.5 Mol) Dianol 22, thereafter melting by heating and dissolving. As catalyst 3.8 g DABCO (0.15% by weight, relative to the total polyurethane) are added.

The components are united at 70° C., intermixed thoroughly, deaerated under vacuum, cast into 4 mm thick plates, and hardened for 18 hours at 110° C. Ater the cutting of the plates, the material is tempered a further 17 hours at 100° C. and 50 mbar, and dried. The moisture content of the cut-up pieces amounts to 0.008%.

$\eta_{rel}$ (0.5 g/dl in DMA+4% LiCl)=1.38.

The material is worked up into Elasthan fibers by means of melt spinning, whereby the extruder temperature amounts to 225°-227° C., the temperature of the spinning pump is 217° C. and the nozzle plate temperature is 208° C.

The extension elasticity characteristics of the fibers, determined according to DIN 53835, are given in Table 1.

TABLE 1

Typical values for the extension elasticity characteristics (according to DIN 53935) of polyurethane-elastomer fibers, which have been manufactured according to Examples 1 and 2.

| | Example 1 | Example 2 |
|---|---|---|
| Titer | 25 tex | 15 tex |
| Tensile strength | 7.2 cN/tex | 8.6 cN/tex |
| Elongation at break | 660% | 590% |
| Force absorption (5$^{th}$ elongation example) | | |
| with 150% elongation | 0.22 cN/tex | 0.27 cN/tex |
| with 300% elongation | 0.86 cN/tex | 1.21 cN/tex |
| Hysteresis constant* | 0.64 | 0.63 |
| Change in rest elongation (according to the 5$^{th}$ cycle) | 28% | 36% |

*Ratio of the force discharge/load, 5$^{th}$ cycle, 150% elongation.

The following Examples concern the changes in the polyurethane softening point depending upon the composition of the chain lengtheners. For this purpose, the resulting polyurethanes are cast into plates that are 2 mm thick.

EXAMPLES 3-7

A semiprepolymer is manufactured by reacting 100 g (0.05 mol) Elastophen 2002, which has been heated under vacuum for 2 hours to 100° C. for the purpose of removing traces of moisture, with 33.9 g (0.204 Mol) trans-1,4-cyclohexanediisocyanate. The mixture is then stirred for 1 hour with simultaneous conducting over of nitrogen and heating to 120° C.

A second reaction component is prepared by adding to a further 100 g (0.05 Mol) of dried Elastophen 2002 the chain lengtheners as set forth by mixtures and amounts in Table 2. The mixture is then melted under heating, and dissolved.

TABLE 2

| Example No. | Chain Lengthener | | softening temperature (°C.) |
|---|---|---|---|
| | Dianol 22 | 1,4-butanediol | |
| 3 | 0.1 Mol (31.64 g) | — | 161 |
| 4 | 0.08 Mol (25.31 g) | 0.02 Mol (1.8 g) | 153 |
| 5 | 0.06 Mol (18.98 g) | 0.04 Mol (3.6 g) | 172 |
| 6 | 0.04 Mol (12.66 g) | 0.06 Mol (5.4 g) | 202 |
| 7 | — | 0.1 Mol (9.0 g) | 220 |

As catalyst, 0.2% by weight (relative to the total amount of polyurethane) of DABCO is added to the second component.

Both components are united at a temperature about 70° C., and mixed together thoroughly. Thereafter the mixture is de-aerated under a vacuum, cast into plates having a thickness of 2 mm, and hardened at 110° C. for a period of 24 hours.

The softening temperatures of the polyurethane are illustrated in FIG. 1, in dependence upon the composition of the chain lengthener.

It will be understood that each of the elements described above, or two or more together, may also find a useful application in other types of polymers differing from the types described above.

While the invention has been illustrated and described as embodied in thermoplastic polyurethane-elastomers from cyclohexane-1,4-diisocyanate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Thermoplastically workable polyurethane-elastomers, obtained by polyaddition of substantially pure trans-cyclohexane-1,4-diisocyanate, marcrodiols of an average molecular weight from 800 to 4000 and chain lengtheners having at least two active hydrogen atoms, said chain lengtheners composed of bisethoxylated Bisphenol A or mixtures of bisethoxylated Bisphenol A with other short-chain diols customarily employed as chain lengtheners.

2. Thermoplastically workable polyurethane-elastomers according to claim 1, wherein said macrodiols are composed from a copolyesterdiol.

3. Thermoplastically workable polyurethane-elastomers according to claim 2, wherein said copolyesterdiol is formed from adipic acid, neopentylglycol and 1,6-hexanediol.

4. Thermoplastically workable polyurethane-elastomers according to claim 1, wherein said macrodiols are selected from the group consisting of polyesters, polyacetals, polylactones and polycarbonates.

5. Thermoplastically workable polyurethane-elastomers according to claim 1, wherein said macrodiols are composed of polyesters based upon adipic acid and glycols.

6. Thermoplastically workable polyurethane-elastomers according to claim 5, wherein said polyester is a mixed polyester of adipic acid and several glycols.

7. Thermoplastically workable polyurethane-elastomers according to claim 5, wherein said glycols are short-chained, having from 2 up to 6 carbon atoms.

8. Thermoplastically workable polyurethane-elastomers according to claim 5, wherein said glycols are long-chained, having at least 6 chain carbon atoms.

9. Thermoplastically workable polyurethane-elastomers according to claim 1, wherein said macrodiols are blended with tri-functional compounds containing triols as alcohol component.

10. Thermoplastically workable polyurethane-elastomers according to claim 9, wherein said trifunctional compounds are polyesters and contain trimethylolpropane as alcohol component.

11. Thermoplastically workable polyurethane-elastomers according to claim 1, obtained through polyaddition of cyclohexane-1,4-diisocyanate-isomer mixtures containing at least an 85% portion of trans-isomers of cyclohexane-1,4-diisocyanate.

12. Thermoplastically workable polyurethane-elastomers according to claim 1, obtained through polyaddition of cyclohexane-1,4-diixocyanate-isomer mixtures containing at least a 95% portion of trans-isomers of cyclohexane-1,4-diisocyanate.

13. Thermoplastically workable polyurethane-elastomers according to claim 1, obtained through polyaddition of cyclohexane-1,4-diisocyanate-isomer mixtures containing at least a 99% poriton of trans-isomers of cyclohexane-1,4-diisocyanate.

14. Thermoplastically workable polyurethane-elastomers according to claim 1, wherein said chain lengthener is composed of mixtures of bisethoxylated Bisphenol A with other short-chain diols customarily employed as chain lengetheners, said mixtures containing bisethoxylated Bisphenol A to the extent of at least 40 Mol percent.

15. Thermoplastically workable polyurethane-elastomers according to claim 1, wherein said chain lengthener is composed of mixtures of bisethoxylated Bisphenol A with other short-chain diols customarily employed as chain lengtheners, said short-chain diols being selected from the group consisting of ethyleneglycol, 1,4-butanediol, 2,3-butanediol, 2,5-hexanediol, 2,5-dimethyl-2,5-hexanediol, 1,2-propanediol, 1,3-propanediol, and 1,5-pentanediol.

16. Thermoplastically workable polyurethane-elastomers according to claim 1, wherein said chain lengethener mixture of bisethoxylated Bisphenol A with other short-chain diols contains butane-1,4-diol as short-chain diol.

17. Process for the production of thermoplastically workable polyurethane-elastomers comprising polyadding substantially pure trans-cyclohexane-1,4-diisocyanate, macrodiols of an average molecular weight from 800 to 4000 and chain lengetheners with at least two active hydrogen atoms, the chain lengetheners being composed from bisethoxylated Bisphenol A or mixtures of bisethoxylated Bisphenol A with other short-chain diols customarily employed as chain lengtheners.

18. Process for the production of polyurethane-elastomers according to claim 17, wherein said macrodiol is a copolyesterdiol.

19. Process for the production of polyurethane-elastomers according to claim 18, wherein said copolyester diol employed is formed from adipic acid, neopentylglycol and 1,6-hexanediol.

20. Process for the production of polyurethane-elastomers according to claim 17, employing as cyclohexane-1,4-diisocyanate a cyclohexane-1,4-diisocyanate-isomer mixture having a trans-isomers portion amounting to at least 85%.

21. Process for the production of polyurethane-elastomers according to claim 17, employing as cyclohexane-1,4-diisocyanate a cyclohexane-1,4-diisocyanate-isomer mixture having a trans-isomers portion amounting to at least 95%.

22. Process for the production of polyurethane-elastomers according to claim 17, employing as cyclohexane-1,4-diisocyanate a cyclohexane-1,4-diisocyanateisomer mixture having a trans-isomers portion amounting to at least 99%.

23. Process for the production of polyurethane-elastomers according to claim 17, employing a mixture of bisethoxylated Bisphenol A and short-chain diols, said mixture containing bisethoxylated Bisphenol A to the extent of at least 40 Mol percent.

24. Process for the production of polyurethane-elastomers according to claim 17, employing as chain lengthener a mixture of bisethoxylated Bisphenol A and short-chain diol, said short-chain diol being butane-1,4-diol.

25. In a process for thermoplastic working-up of materials into elastic shaped bodies, the improvement wherein polyurethane according to claim 1 is employed as said material.

26. In a process for the production of elastomer fibers of the type in which a material is melted and spun into fibers, the improvement wherein polyurethanes according to claim 1 are employed as said material.

* * * * *